Oct. 9, 1928.
R. B. BROWN
1,686,953
MIXING APPARATUS
Filed Dec. 29, 1924
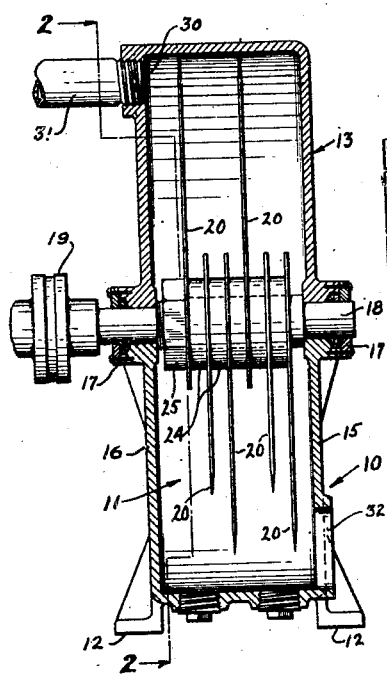
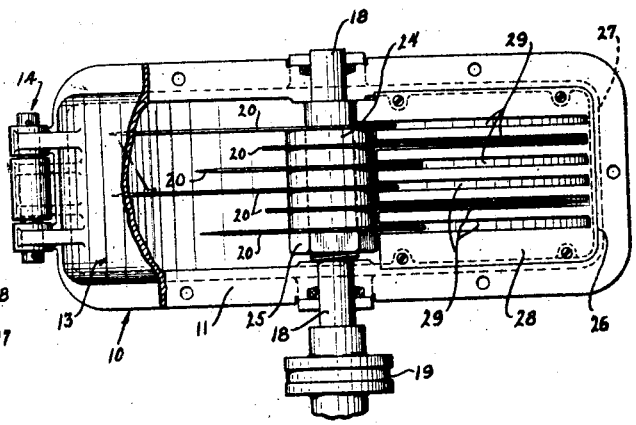
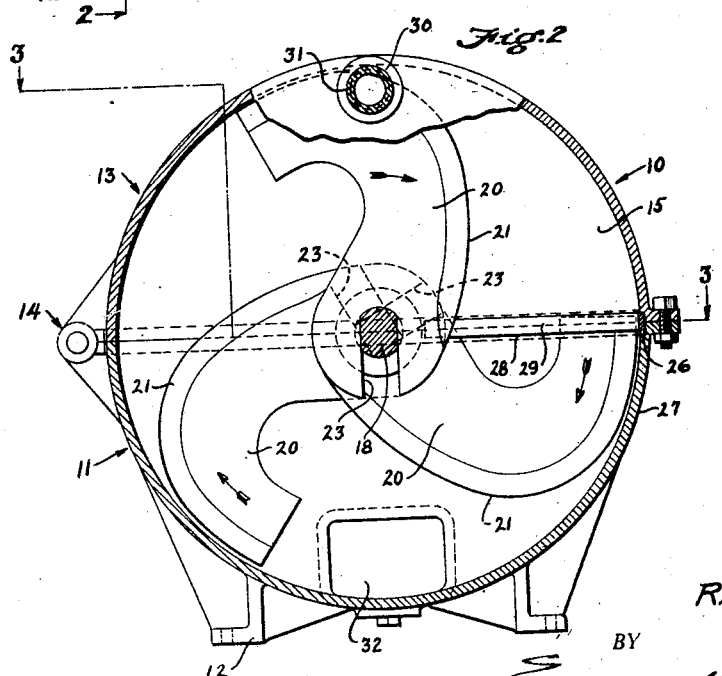
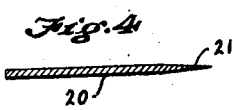
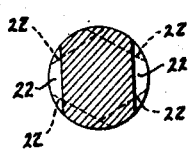
INVENTOR.
RALSTON B. BROWN
BY
ATTORNEY.

Patented Oct. 9, 1928.

1,686,953

UNITED STATES PATENT OFFICE.

RALSTON B. BROWN, OF LOS ANGELES, CALIFORNIA.

MIXING APPARATUS.

Application filed December 29, 1924. Serial No. 758,562.

This invention relates to an apparatus designed to be employed in the manufacture of lard compound products.

In the manufacture of lard compounds, now generally used as a substitute for kettle rendered lards prepared from animal fats, the final product produced is somewhat "stiff" and coarse in texture, qualities that are undesirable to the users of such products as they are extremely hard to "work" or mix evenly into the dough formations. Moreover the color of the compounds as produced are uneven and oftentimes of a streaked appearance, imparting to the finished product such as bread or crackers a creamy tint.

By subjecting the lard compounds after formation by the usual processes to the action of my improved apparatus, the above recited objections to the finished product are generally obviated, the compound emerging therefrom being of a light "fluffy" texture that is easily blended, evenly distributed throughout the dough mixtures, and of a "snow white" color.

It is an object of my invention to provide a simple apparatus for effectually treating lard compounds after their formation to further enhance their lightness, and to impart an even uniform color thereto.

A further object is to provide a mixing apparatus for lard compounds having the most logical disposition of parts in order to obtain simplicity of construction and operation without decreasing its efficiency or increasing its cost of manufacture or maintenance.

Other objects and advantages of this invention, not at this time particularly enumerated, will be clearly understood from the following detailed description, reference being had to the drawings accompanying the same in which:

Fig. 1 is a central vertical section through the apparatus.

Fig. 2 is a sectional front elevation on line 2—2 of Fig. 1.

Fig. 3 is a top plan view with a portion of the cover broken away.

Fig. 4 is a transverse section through one of the mixing knives.

Fig. 5 is an enlarged transverse section of the grooved section of the rotating knife shaft showing the disposition of its surface grooves in which the mixing knives are mounted.

Referring now more specifically to the drawing, the improved mixing apparatus preferably consists of a housing 10, substantially circular in side elevation, composed of a lower section 11 provided at its bottom with a supporting base 12 for rigidly securing the apparatus to the floor or other suitable foundation, and an upper section 13 secured to the lower by a hinge 14, its free end being bolted or otherwise secured to the lower section in fluid tight engagement therewith. By removably securing the upper section of the housing to the lower, access to the interior of the apparatus may be readily obtained for the purpose of cleansing, renewing, or adjustment, of the mechanism disposed therein.

Each of the flat circular side walls 15, 16, of the housing at the center thereof are provided with outwardly projecting bearings 17, in which is mounted a rotating shaft 18, one end being directly connected by a flexible coupling 19, to an electric motor or other source of power, not shown. Radially mounted on shaft 18 are a plurality of mixing knives 20 of hooked formation in order that their cutting edges 21 will have a shearing action on the lard compounds being operated upon. That portion of the shaft 18 lying between the inner faces of the flat circular walls 15, 16, of the housing is of greater diameter than the ends disposed in the bearings, and is provided in its circular surfaces with a plurality of tangential grooves 22 arranged in pairs, the radially disposed slots 23 formed on the hub end of the knives 20 engaging the grooves 22 and securing knives against movement during their rotation.

Each pair of knives 20 are radially spaced apart equally, as clearly shown in Fig. 3, and each knife is separated by circular spacing washers 24, an adjusting nut 25 on the shaft holding the knives in rigid relation to the shaft.

Bolted or otherwise secured to the edges of the lower section of the housing, and extending from the periphery of the shaft 18 to the edge 26 of the semi-circular wall 27 of the lower member of the housing, is a horizontally disposed plate 28, provided with a plurality of longitudinally extending slots or openings 29 for permitting the passage therethrough of the hooked mixing knives during their rotation, the width of the slots being slightly greater than the thickness of the knives.

Side wall 15 adjacent its highest point is provided with a threaded inlet opening 30, a supply pipe 31 leading from a source of supply (not shown) conveying the semi-solid lard compounds to the apparatus in a continuous stream during its operation. Wall 16 of the lower member of the housing is provided with a discharge opening 32 adjacent its lowermost point through which the lard compounds are ejected from the apparatus into suitable containers after a mixing treatment.

From the above description, and in connection with the following, the operation of the apparatus will be readily understood. The lard compounds as now generally manufactured consist of a mixture of melted animal fats, such as suets, and vegetable oils, the heated mixture being delivered in a thin wide stream to chilled rolls to solidify the same, preparatory to packing in containers for the market. The apparatus is set in motion and the chilled compounds are forced through the inlet pipe 31 to the interior of the apparatus, the rotating hooked mixing knives carrying the semi-solid compounds forwardly in the direction of their rotation onto the slotted plate 28, the knives forcing the compounds through the slots, and thoroughly mixing and lightening the mass. As the compounds are continuously delivered to the apparatus, and as the knives are revolved at a high rate of speed, (approximately 1500 R. P. M.) it will be apparent that the knives will be forced through the mass a number of times before they emerge through the outlet opening 32 of the apparatus. As the knife blades are of curved or hooked form in side elevation, it will be apparent that the semi-solid mass of compound will offer little or no resistance to their passage therethrough, the curved knives having a "shearing" action. From the outlet the compounds are delivered into tubs or barrels in which form they are generally marketed.

What I claim is:

1. An apparatus for the continuous mixing and delivery of semi-solid material, comprising a housing having an inlet in the upper portion of the one side wall thereof and an outlet opening in the lower portion of the opposite side wall, a rotatable shaft in said housing, a plurality of curved knives arranged in staggered relation on said shaft, the knives having blades which pass transversely of the inlet and outlet openings, a horizontal plate in said housing, said plate having slots therein registering with the knives and permitting the passage therethrough of the knives and the material carried thereby.

2. An apparatus for the continuous mixing of semi-solid material comprising a housing having an inlet port in the upper portion of one side wall thereof, a rotatable shaft extending between the side walls, a plurality of knives mounted in staggered relation on said shaft and extending radially thereof, said knives having blades which pass transversely of the inlet port upon the rotation of the shaft.

3. An apparatus for the continuous mixing and delivery of semi-solid material, comprising a housing having an inlet port in the upper portion of one side wall and an outlet port in the lower portion of the opposed side wall, a rotatable shaft extending between said walls, a plurality of knives mounted on said shaft and spaced longitudinally thereof and in staggered relation to each other.

In witness that I claim the foregoing I have hereunto subscribed my name this 28th day of November, 1924.

RALSTON B. BROWN.